United States Patent [19]

Gorney

[11] Patent Number: 4,655,397

[45] Date of Patent: Apr. 7, 1987

[54] VORTEX DRIPPER

[75] Inventor: Moshe Gorney, Kibbutz Naan, Israel

[73] Assignee: Naan Mechanical Works, Kibbutz Naan, Israel

[21] Appl. No.: 687,559

[22] Filed: Dec. 28, 1984

[30] Foreign Application Priority Data

Jan. 9, 1984 [IL] Israel ............................................ 70646

[51] Int. Cl.$^4$ ........................ B05B 15/00; F15D 0/00
[52] U.S. Cl. .................................. 239/542; 239/547; 138/39
[58] Field of Search ........................ 239/542, 547, 570; 138/39, 43, 46

[56] References Cited

U.S. PATENT DOCUMENTS 4,215,822  8/1980  Mehoudar ........................... 239/542

FOREIGN PATENT DOCUMENTS 950005  6/1974  Canada ................................. 239/547

Primary Examiner—Andres Kashnikow
Assistant Examiner—Patrick N. Burkhart
Attorney, Agent, or Firm—Browdy and Neimark

[57] ABSTRACT

Drip irrigation emitter apparatus comprising a water inlet, a water outlet, and an elongated flowpath extending from the water inlet to the water outlet, the flowpath defining an entrance coupled to the water inlet and extending into a type one vortex region, the type one vortex region extending via an intermediate region into a type two vortex region, the type two vortex region extending via an intermediate region into a type one vortex region, and wherein the type one vortex region comprises a region including a first rounded concave corner having a first radius of curvature and a first substantially pointed convex vertex to a first side of the first rounded concave corner, and the type two vortex region comprises a second rounded concave corner having a second radius of curvature and a second generally pointed convex vertex to a second side of the second rounded concave corner.

31 Claims, 8 Drawing Figures

VORTEX DRIPPER

FIELD OF THE INVENTION

The present invention relates to drip irrigation apparatus generally and more particularly to drip irrigation emitter inserts suitable for incorporation into continuous drip irrigation hoses.

BACKGROUND OF THE INVENTION

A great variety of drip irrigation apparatus is known in the marketplace and is described in the patent literature. An early disclosure of a vortex-type drip irrigation emitter is found in Israel Pat. No. 30618 of the present applicant. The first continous drip irrigation hose is described in Israel Pat. No. 45211. A further development of continous drip irrigation hoses appears in applicant's UK Pat. No. 2,069,803 which described hoses wherein emitter inserts of variable spacing and capacity are incorporated in a continuous hose preferably in accordance with computer control based on the contours of the land at which they are to be installed.

A pressure controlled continuous emitter hose is described in applicant's South African Pat. No. 82/5043.

Various types of emitter labyrinth configurations are described in the patent literature. Subsequent to applicant's Israel Pat. No. 30618, there appear Israel Pat. No. 34566 which illustrates a back and forth flow path, Israel Pat. No. 36901 which specifies certain details of the tooth and flow path configurations defined by the labyrinth, and Israel Pat. No. 45465 which specifies the relationship between tooth tip width and the flow path dimensions and the coaxial, non-overlapping relationship of the tips of the opposite facing adjacent teeth in the labyrinth. The last three prior art patents all relate to non-vortex type drippers.

Additionally, there exists a large body of literature relating to the design, construction and operation of drip irrigation emitter flow path labyrinths in engineering literature relating to hydrodynamics which is used, for example, in the design of fluid seals.

There exists a fundamental problem and limitation in all known drip irrigation systems, the collection of sediment in the emitter labyrinth passages, resulting in partial or even complete blockage thereof. This problem is dealt with in conventional drip irrigation systems of which the last three patents described above are examples, by periodic backflushing.

SUMMARY OF THE INVENTION

The present invention seeks to provide an improved drip irrigation emitter insert which is particularly suitable for incorporation into a continuous drip irrigation hose but may also be employed in conventional non-continuous emitters as well.

There is thus provided in accordance with a preferred embodiment of the present invention drip irrigation emitter apparatus comprising a water inlet, a water outlet, and an elongated flowpath extending from the water inlet to the water outlet, the flowpath defining an entrance coupled to the water inlet and extending into a type one vortex region, the type one vortex region extending via an intermediate region into a type two vortex region, the type two vortex region extending via an intermediate region into a type one vortex region, and wherein the type one vortex region comprises a region including a first rounded concave corner having a first radius of curvature and a first substantially pointed convex vertex to a first side of the first rounded concave corner, and the type two vortex region comprises a second rounded concave corner having a second radius of curvature and a second generally pointed convex vertex to a second side of the second rounded concave corner.

Further in accordance with an embodiment of the invention, the first and second radii of curvature may be identical. Alternatively they may be different.

Additionally in accordance with a preferred embodiment of the present invention, the separation between the imaginary center of curvature of the first rounded concave corner and the first substantially pointed convex vertex is less than the first radius of curvature and the separation between the imaginary center of curvature of the second rounded concave corner and the second generally pointed convex vertex is less than the second radius of curvature.

Further in accordance with a preferred embodiment of the present invention, the intermediate regions have a uniform cross section. Additionally in accordance with a preferred embodiment of the invention, there are provided a plurality of series of intermediate regions which are generally parallel, thus providing a flow path comprising a plurality of generally elongate sections, each including a plurality of type one and type two vortex regions joined by parallel directed intermediate regions. Alternatively, the intermediate regions need not be parallel.

Additionally in accordance with an embodiment of the present invention the junction between each of the intermediate regions and each following vortex region defines a substantially sharp corner.

Further in accordance with an embodiment of the present invention, the type one vortex region is provided with a first left concave corner to the left of the convex vertex, while the type two vortex region is provided with a second right concave corner to the right of the convex vertex. The respective left or right concave corners may define sharp or rounded corners.

BRIEF DESCRIPTION OF THE DRAWING

The present invention will be understood and appreciated more fully from the following detailed description taken in conjunction with the drawing in which.

DETAILED DESCRIPTION OF THE INVENTION

Figure 1:
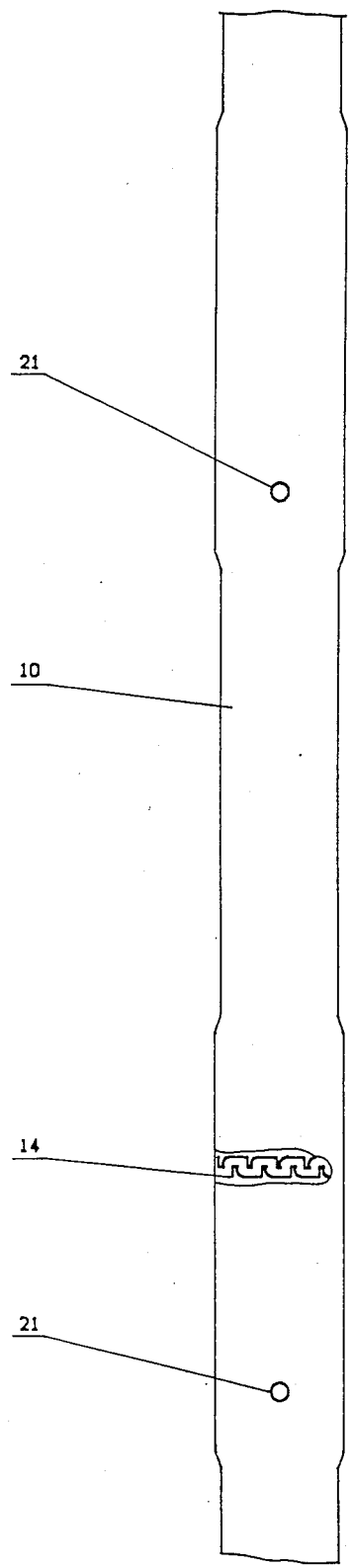
FIG. 1 is a partially cut away pictorial illustration of a continuous drip irrigation hose constructed and operative in accordance with an embodiment of the present invention.
Figure 2A:
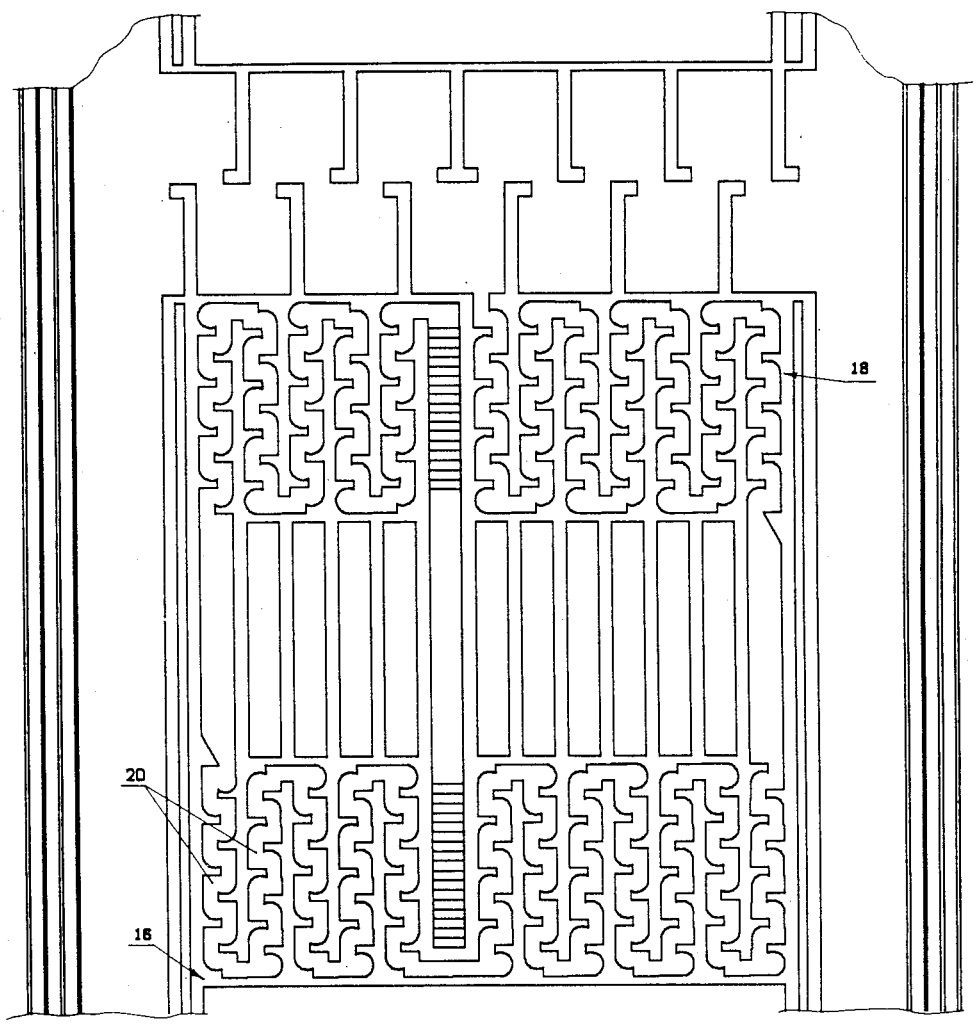
FIGS. 2A and 2B are illustrations of a drip irrigation emitter insert constructed and operative in accordance with a preferred embodiment of the present invention in respective cut and spread out form and in partially cut away side view form.
Figure 2B:
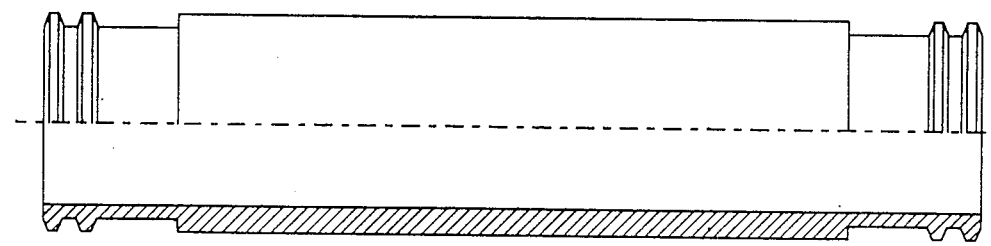

Reference is now made to FIGS. 1, 2A and 2B which illustrate a continuous drip irrigation hose 10, constructed and operative in accordance with a preferred embodiment of the invention. It may be seen that the continuous drip irrigation hose comprises a continuous, preferably extruded hose, which includes, at predetermined, not necessarily uniform, intervals, drip irrigation emitter inserts of the type illustrated in FIGS. 2 and 3. These inserts are sealingly joined with the extruded hose during manufacture so as to define between the inserts and the hose a pressure and/or flow reducing pathway as will be described hereinbelow.

It may be appreciated that water flows through the continuous drip irrigation hose and passes through an aperture (not shown) which provides a supply of water at line pressure to the entrance of a pressure and/or flow reducing flow path 14. It can be seen that flow path 14 comprises a pair of main sections, 16 and 18 each of which comprises a plurality of elongated subsections 20. Water having a reduced head leaves the flow path 14 via apertures 21.

The construction and configuration of emitter inserts employed in the apparatus of FIG. 1 is illustrated generally in FIGS. 2A and 2B. It is appreciated that the illustration of FIG. 2A attempts to show, in two dimensional form, the outer cylindrical configuration of the emitter insert, which is shown in a side view, partially cut away in FIG. 2B. It is also noted that the section illustrated in FIG. 2B is not necessarily accurate and is provided to show the general configuration of the emitter insert. It is further noted that the configuration of the insert shown in FIGS. 2A and 2B is one of a number of possible configurations and is provided for the purpose of general illustration only.

It is also noted that the flow path illustrated in the drawings herein may be relatively long or relatively short and may be associated, if suitable and desirable with a pressure compensating feature of suitable construction. The flow path illustrated may be associated with an opposite surface provided by an outer hose as in FIG. 1, a cover member or a diaphragm element, for example. The precise configuration of the flow path subsections will now be described with particular reference to FIG. 3.

Figure 3:
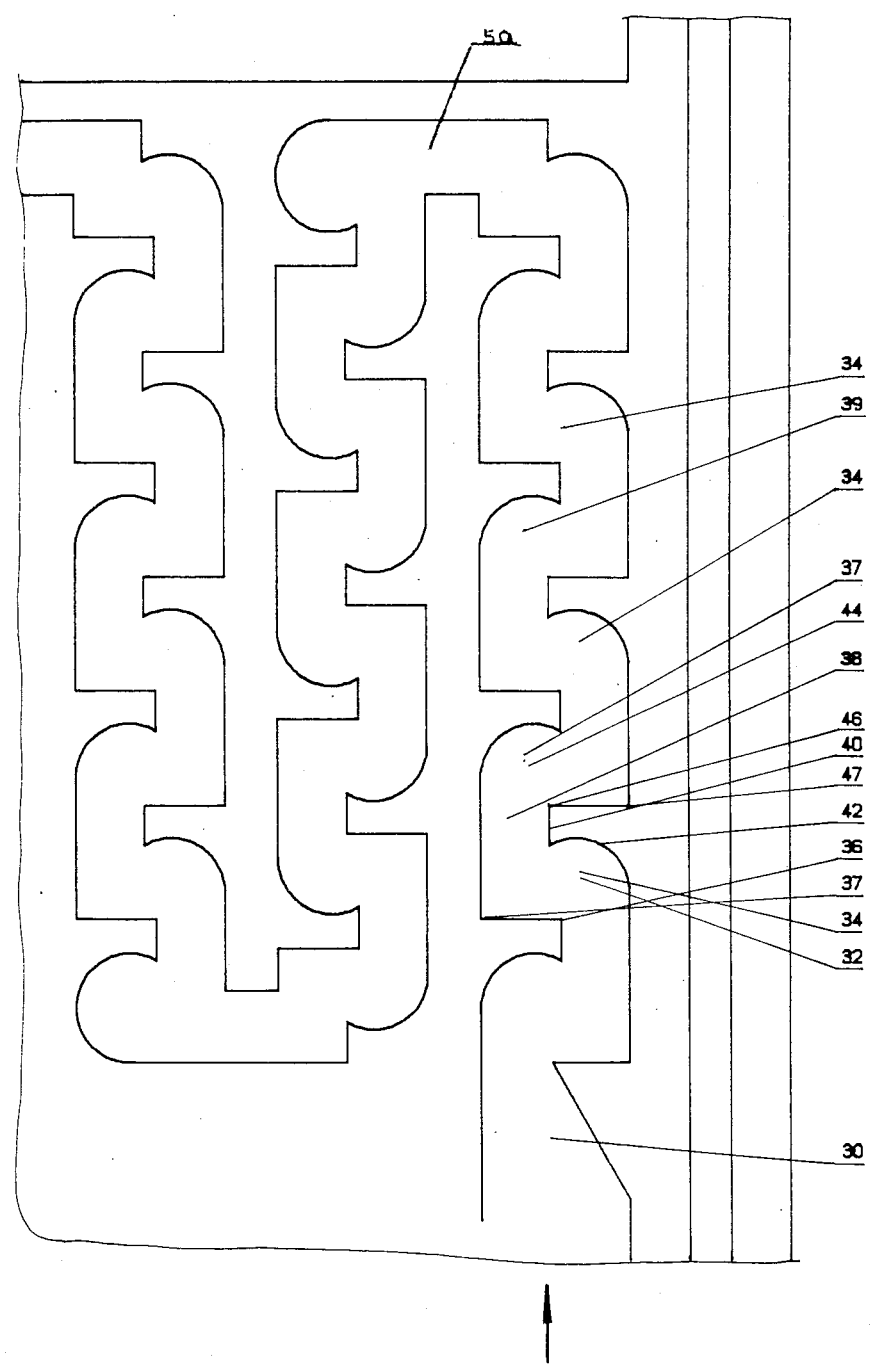
FIG. 3 is a detailed illustration of a portion of the flow path of the drip irrigation emitter of FIG. 2.

Referring now to FIG. 3 there is seen an entrance 30 which leads from the water supply aperture and extends into a type one vortex region 32 defining a first rounded concave corner 34 having a first radius of curvature and a first generally substantially pointed convex vertex 36 to the left of and facing the first rounded concave corner. According to a preferred embodiment of the invention vertex 36 is spaced from the imaginary center of curvature of rounded concave corner 34 by a distance which is less than the first radius of curvature.

Further in accordance with a preferred embodiment of the invention, the type one vortex region also includes a left concave corner 37 which is typically pointed but which may be rounded. Corner 37 lies to the left of vertex 36 in the sense of FIG. 3.

It is appreciated that the directions left and right mentioned above may equally be reversed and thus, in general terms, there may be substituted for left and right, the expressions, to a first or second side. Furthermore corner 37 may be generalized as an adjacent concave corner, which may be pointed or rounded as suitable.

It is appreciated that entrance 30 may itself define a vortex region. Since its configuration differs somewhat from that of the vortex regions, it is being described separately.

Vortex region 32 terminates in an intermediate region 38 of generally uniform cross section. According to a preferred embodiment of the invention, the wall 40 of the intermediate region 38 defines a sharp corner 42 with the rounded concave corner 34.

Intermediate region 38 extends into a type two vortex region 39 which defines a second rounded concave corner 44, having a second radius of curvature, and a second generally pointed convex corner vertex 46 to the right of and facing the second rounded concave corner. According to a preferred embodiment of the invention vertex 46 is spaced from the imaginary center of curvature of rounded concave corner 44 by a distance with exceeds the first radius of curvature.

Additionally in accordance with a preferred embodiment of the invention, the type two vortex region also includes a right concave corner 47 which is typically pointed but which may be rounded. Corner 47 lies to the right of vertex 46 in the sense of FIG. 3.

Type two vortex region 39 extends into a further type one vortex region, which is followed via an intermediate region by a further type two vortex region and so on, until the end of a subjection is reached. Here a direction reversal region 50 couples the water flow to another subsection and the configuration is repeated.

Figure 4:
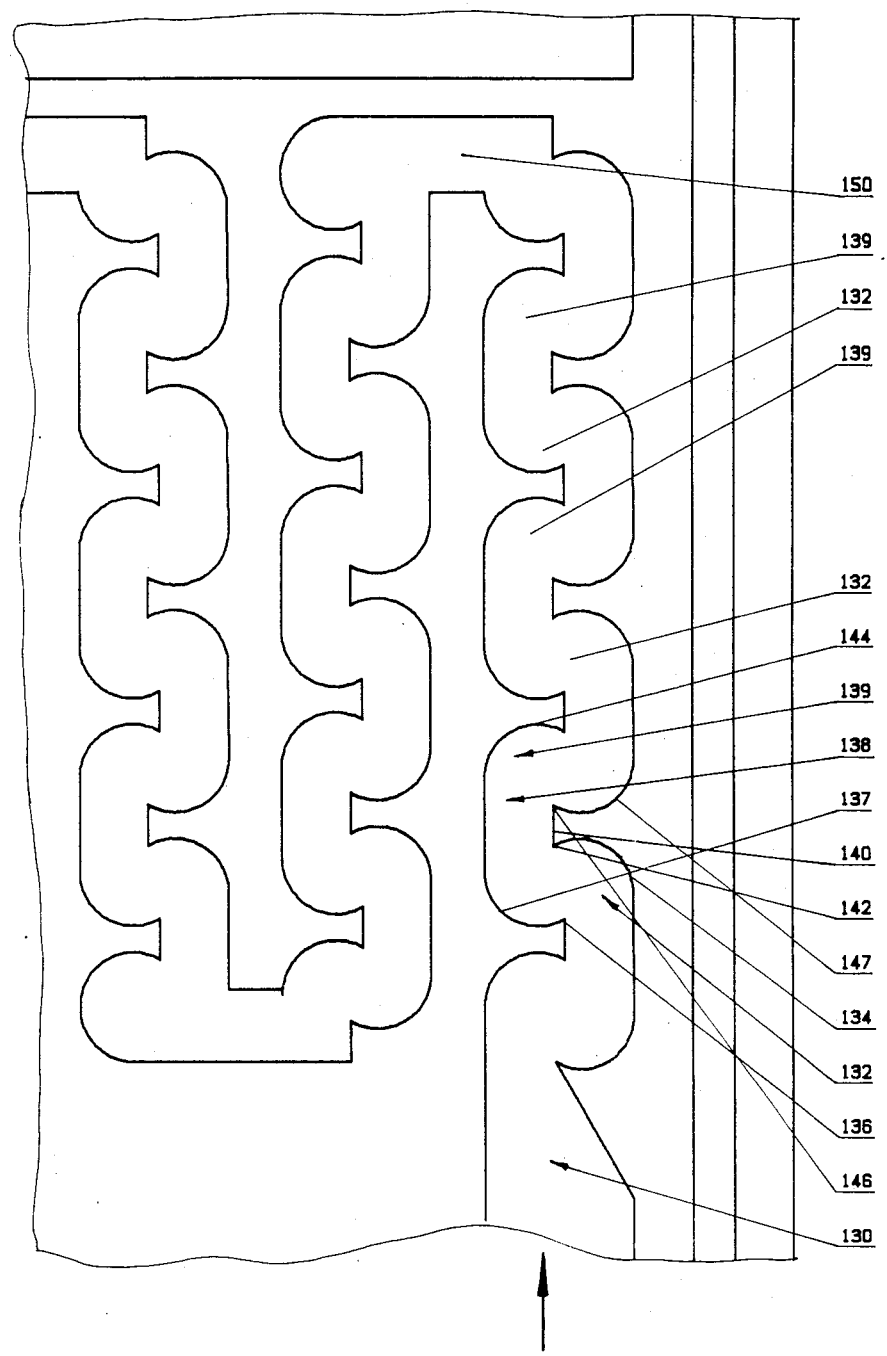
FIG. 4 is a generalized illustration of a portion of a flow path of a variation of the drip irrigation emitter of FIG. 3.

An illustration of a flow passageway wherein concave corners 37 and 47 are rounded appears in FIG. 4.

Referring now to FIG. 4 there is seen an entrance 130 which leads from the water supply aperture and extends into a type one vortex region 132 defining a first rounded concave corner 134 having a first radius of curvature and a first generally substantially pointed convex vertex 136 to the left of and facing the first rounded concave corner. According to a preferred embodiment of the invention, vertex 136 is spaced from the imaginary center of curvature of rounded concave corner 134 by a distance which is less than the first radius of curvature.

Further in accordance with a preferred embodiment of the invention, the type one vortex region also includes a left concave corner 137 which is rounded. Corner 137 lies to the left of vertex 136 in the sense of FIG. 4.

It is appreciated that the directions left and right mentioned above may equally be reversed and thus, in general terms, there may be substituted for left and right, the expressions, to a first or second side. Furthermore corner 137 may be generalized as an adjacent concave corner, which may be pointed or rounded as suitable.

It is appreciated that entrance 130 may itself define a vortex region. Since its configuration differs somewhat from that of the vortex regions, it is being described separately.

Vortex region 132 terminates in an intermediate region 138 of generally uniform cross section. According to a preferred embodiment of the invention, the wall 140 of the intermediate region 138 defines a sharp corner 142 with the rounded concave corner 134.

Intermediate region 138 extends into a type two vortex region 139 which defines a second rounded concave corner 144, having a second radius of curvature, and a second generally pointed convex vertex 146 to the right of and facing the second rounded concave corner. According to a preferred embodiment of the invention vertex 146 is spaced from the imaginary center of curvature of rounded concave corner 144 by a distance which exceeds the first radius of curvature.

Additionally in accordance with a preferred embodiment of the invention, the type two vortex region also includes a right concave corner 147 which is rounded. Corner 147 lies to the right of vertex 146 in the sense of FIG. 4.

Type two vortex region 139 extends into a further type one vortex region, which is followed via an intermediate region by a further type two vortex region and so on, until the end of a subsection is reached. Here a direction reversal region 150 couples the water flow to another subsection and the configuration is repeated.

Figure 5:
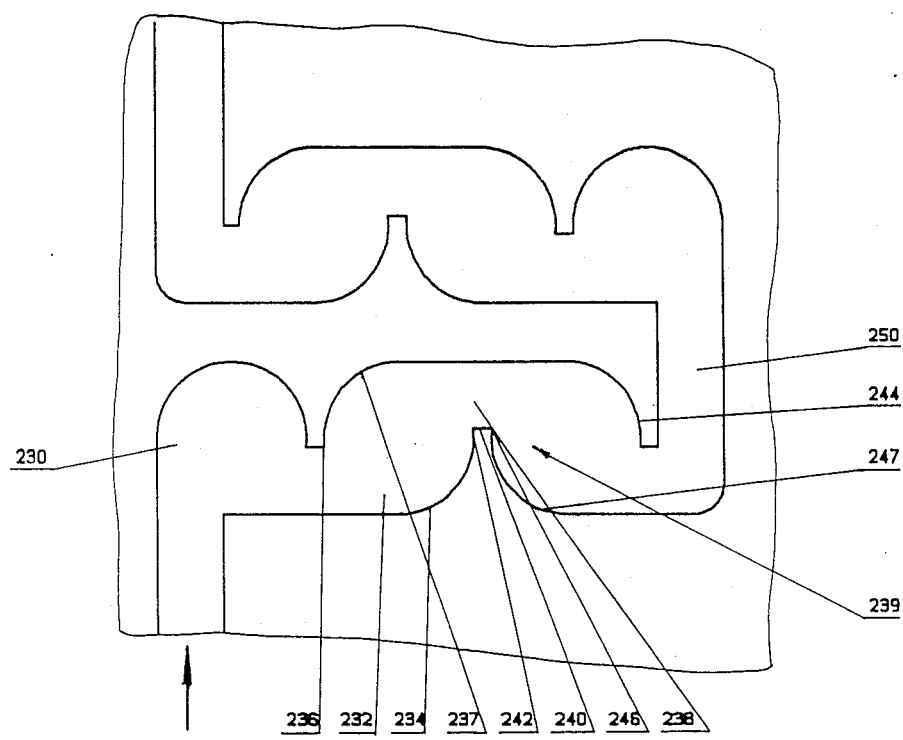
FIG. 5 is a generalized illustration of a portion of a flow path of another variation of the drip irrigation emitter of FIG. 3.

Reference is now made to FIG. 5 which illustrates a further alternative embodiment of flow path. Referring now to FIG. 5 there is seen an entrance 230 which leads from the water supply aperture and extends into a type one vortex region 232 defining a first rounded concave corner 234 having a first radius of curvature and a first generally substantially pointed convex vertex 236 to the left of and facing the first rounded concave corner. According to a preferred embodiment of the invention, vertex 236 is spaced from the imaginary center of curvature of rounded concave corner 234 by a distance which is approximately equal to the first radius of curvature.

Further in accordance with a preferred embodiment of the invention, the type one vortex region also includes a left concave corner 2137 which is rounded. Corner 237 lies to the left of vertex 236 in the sense of FIG. 5.

It is appreciated that the directions left and right mentioned above may equally be reversed and thus, in general terms, there may be substituted for left and right, the expressions, to a first or second side. Furthermore corner 237 may be generalized as an adjacent concave corner, which may be pointed or rounded as suitable.

It is appreciated that entrance 230 may itself define a vortex region. Since its configuration differs somewhat from that of the vortex regions, it is being described separately.

Vortex region 232 terminates in an intermediate region 238 of generally uniform cross section. According to a preferred embodiment of the invention, the wall 240 of the intermediate region 238 defines a sharp corner 242 with the rounded concave corner 234.

Intermediate region 238 extends into a type two vortex region 239 which defines a second rounded concave corner 244, having a second radius of curvature, and a second generally pointed convex vertex 246 to the right of and facing the second rounded concave corner. According to a preferred embodiment of the invention vertex 246 is spaced from the imaginary center of curvature of rounded concave corner 244 by a distance which is approximately equal to the first radius of curvature.

Additionally in accordance with a preferred embodiment of the invention, the type two vortex region also includes a right concave corner 247 which is rounded. Corner 247 lies to the right of vertex 246 in the sense of FIG. 5.

Type two vortex region 239 extends into a further type one vortex region, which is followed via an intermediate region by a further type two vortex region and so on, until the end of a subjection is reached. Here a direction reversalregion 250 couples the water flow to another subsection and the configuration is repeated.

Figure 6:
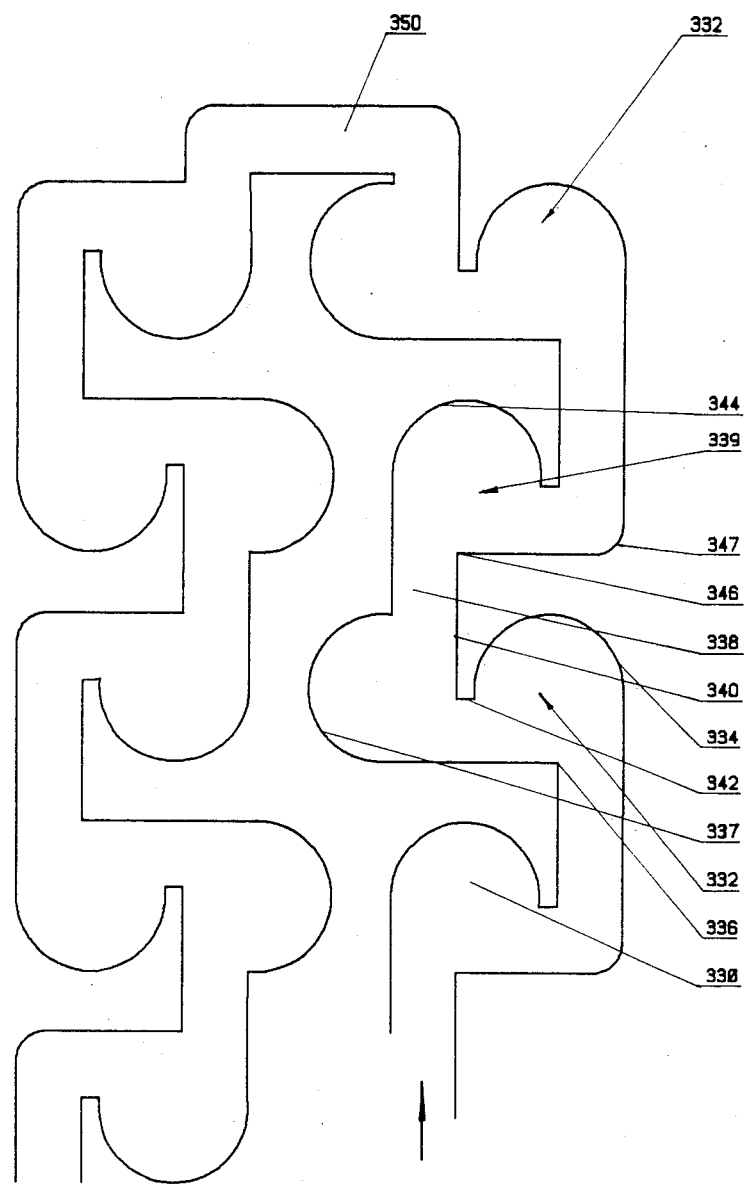
FIG. 6 is a generalized illustration of a portion of a flow path of a further variation of the drip irrigation emitter of FIG. 3.

Reference is now made to FIG. 6, which illustrates a further alternative embodiment of flow path. Referring now to FIG. 6 there is seen an entrance 330 which leads from the water supply aperture and extends into a type one vortex region 332 defining a first rounded concave corner 334 having a first radius of curvature and a first generally substantially pointed convex vertex 336 facing the first rounded concave corner. According to a preferred embodiment of the invention, vertex 336 is spaced from the imaginary center of curvature of rounded concave corner 334 by a distance which is approximately equal to the first radius of curvature.

Further in accordance with a preferred embodiment of the invention, the type one vortex region also includes a left concave corner 337 which is rounded. Corner 337 lies to the left of vertex 336 in the sense of FIG. 6.

It is appreciated that the directions left and right mentioned above may equally be reversed and thus, in general terms, there may be substituted for left and right, the expressions, to a first or second side. Furthermore corner 337 may be generalized as an adjacent concave corner, which may be pointed or rounded as suitable.

It is appreciated that entrance 330 may itself define a vortex region. Since its configuration differs somewhat from that of the vortex regions, it is being described separately.

Vortex region 332 terminates in an intermediate region 338 of generally uniform cross section. According to a preferred embodiment of the invention, the wall 340 of the intermediate region 338 defines a sharp corner 342 with the rounded concave corner 334.

Intermediate region 338 extends into a type two vortex region 339 which defines a second rounded concave corner 344, having a second radius of curvature, and a second generally pointed convex vertex 346 facing the second rounded concave corner. According to a preferred embodiment of the invention vertex 346 is spaced from the imaginary center of curvature of rounded concave corner 344 by a distance which is approximately equal to the first radius of curvature.

Additionally in accordance with a preferred embodiment of the invention, the type two vortex region also includes a right concave corner 347 which is rounded. Corner 347 lies to the right of vertex 346 in the sense of FIG. 6.

Type two vortex region 339 extends into a further type one vortex region, which is followed via an intermediate region by a further type two vortex region and so on, until the end of a subjection is reached. Here a direction reversalregion 350 couples the water flow to another subsection and the configuration is repeated.

Figure 7:
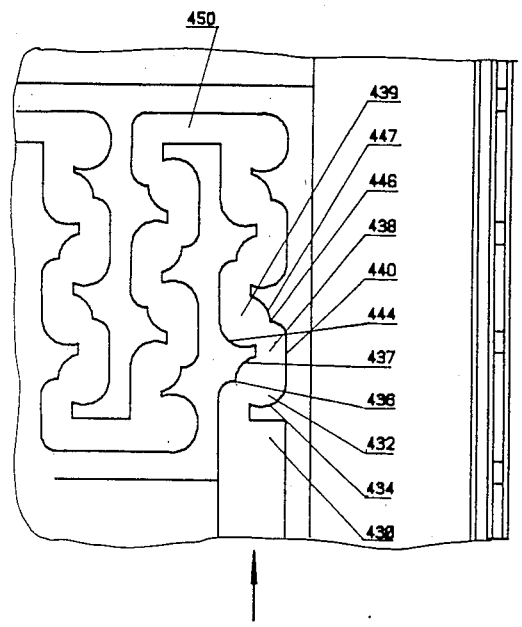
FIG. 7 is a generalized illustration of a portion of a flow path of a further variation of the drip irrigation emitter of FIG. 3.

Reference is now made to FIG. 7, which illustrates a further alternative embodiment of flow path. Referring now to FIG. 7 there is seen an entrance 430 which leads from the water supply aperture and extends into a type one vortex region 432 defining a first rounded concave corner 434 having a first radius of curvature and a first generally substantially pointed convex vertex 436 facing the first rounded concave corner. According to a preferred embodiment of the invention, vertex 436 is spaced from the imaginary center of curvature of rounded concave corner 434 by a distance which is approximately equal to the first radius of curvature.

Further in accordance with a preferred embodiment of the invention, the type one vortex region also includes a right concave corner 437 which is rounded. Corner 437 lies to the right of vertex 436 in the sense of FIG. 7.

It is appreciated that the directions left and right mentioned above may equally be reversed and thus, in general terms, there may be substituted for left and right, the expressions, to a first or second side. Furthermore corner 437 may be generalized as an adjacent concave corner, which may be pointed or rounded as suitable.

It is appreciated that entrance 430 may itself define a vortex region. Since its configuration differs somewhat from that of the vortex regions, it is being described separately.

Vortex region 432 terminates in an intermediate region 438 of generally uniform cross section. According to a preferred embodiment of the invention, the wall 440 of the intermediate region 438 defines a continuous smooth line with the rounded concave corner 434.

Intermediate region 438 extends into a type two vortex region 439 which defines a second rounded concave corner 444, having a second radius of curvature, and a second generally pointed convex vertex 446 facing the second rounded concave corner. According to a preferred embodiment of the invention vertex 446 is spaced from the imaginary center of curvature of rounded concave corner 444 by a distance which is approximately equal to the first radius of curvature.

Additionally in accordance with a preferred embodiment of the invention, the type two vortex region also includes a left concave corner 447 which is rounded. Corner 447 lies to the left of vertex 446 in the sense of FIG. 7.

Type two vortex region 439 extends into a further type one vortex region, which is followed via an intermediate region by a further type two vortex region and so on, until the end of a subsection is reached. Here a direction reversal region 450 couples the water flow to another subsection and the configuration is repeated.

In all of the embodiments described above, the flow path may comprise only a single "subsection" and need not comprise a plurality of such subsections. Such will normally be the case wherein the flowpath is combined with a pressure compensating feature.

It will be appreciated by persons skilled in the art that the present invention is not limited by what has been particularly shown and described hereinabove. Rather the scope of the present invention is defined only by the claims which follows:

I claim:
1. Drip irrigation emitter apparatus comprising:
a water inlet;
a water outlet; and
an elongated flowpath extending in a flowpath direction from said water inlet to said water outlet, said flowpath defining an entrance coupled to said water inlet and extending into a type one vortex region, said type one vortex region extending via an intermediate region into a type two vortex region, said type two vortex region extending via an intermediate region into a type one vortex region, and wherein said type one vortex region comprises a region including a first rounded concave corner having a first radius of curvature and a first substantially pointed convex vertex to a first side of said first rounded concave corner, the first rounded concave corner extending from the water inelt to the water outlet initially in said flowpath direction and subsequently curving in a direction at least partially against said flowpath direction at the end of the corner closest to the water outlet;

said type two vortex region comprises a second rounded concave corner having a second radius of curvature and a second generally pointed convex vertex to a second side of the second rounded concave corner, the second rounded concave corner extending from the water inlet to the water outlet initially in said flowpath direction and subsequently curving in a direction at least partially against said flowpath direction at the end of the corner closest to the water outlet.

2. Apparatus according to claim 1 and wherein said first and second radii of curvature are identical.

3. Apparatus according to claim 1 and wherein said first and second radii of curvature are different.

4. Apparatus according to claim 1 and wherein the separation between the imaginary center of curvature of the first rounded concave corner and the first substantially pointed convex vertex is less than the first radius of curvature and the separation between the imaginary center of curvature of the second rounded concave corner and the second generally pointed convex vertex is less than the second radius of curvature.

5. Apparatus according to claim 1 and wherein the separation between the imaginary center of curvature of the first rounded concave corner and the first substantially pointed convex vertex is equal to the first radius of curvature and the separation between the imaginary center of curvature of the second rounded concave corner and the second generally pointed convex vertex is equal to the second radius of curvature.

6. Apparatus according to claim 1 and wherein said intermediate regions have a uniform cross section.

7. Apparatus according to claim 1 and including a plurality of series of intermediate regions and a flow path comprising a plurality of generally elongate sections, each including a plurality of type one and type two vortex regions joined by said intermediate regions.

8. Apparatus according to claim 6 and wherein said intermediate regions are generally parallel to each other.

9. Apparatus according to claim 6 and wherein said intermediate regions are not parallel to each other.

10. Apparatus according to claim 7 and wherein the junction between each of said intermediate regions and each following vortex region defines a substantially sharp corner.

11. Apparatus according to claim 1 and wherein said type one vortex region also includes a first adjacent concave corner adjacent to said first convex vertex.

12. Apparatus according to claim 1 and wherein said type two vortex region also includes a second adjacent concave corner adjacent to said second convex vertex.

13. Apparatus according to claim 11 and wherein said first adjacent concave corner comprises a substantially pointed corner.

14. Apparatus according to claim 11 and wherein said second adjacent concave corner comprises a substantially pointed corner.

15. Apparatus according to claim 11 and wherein said first adjacent concave corner comprises a substantially rounded corner.

16. Apparatus according to claim 11 and wherein said second adjacent concave corner comprises a substantially rounded corner.

17. A continuous drip irrigation hose including an outer hose and emitter inserts located at predetermined locations along said hose, said emitter inserts comprising:

a water inlet;

a water outlet; and an elongated flowpath extending in a flowpath direction from said water inlet to said water outlet, said flowpath defining an entrance coupled to said water inlet and extending into a type one vortex region, said type one vortex region extending via an intermediate region into a type two vortex region, said type two vortex region extending via an intermediate region into a type one vortex region, and wherein said type one vortex region comprises a region including a first rounded concave corner having a first radius of curvature and a first substantially pointed convex vertex to a first side of said first rounded concave corner, the first rounded concave corner extending from the water inlet to the water outlet initially in said flowpath direction and subsequently curving in a direction at least partially against said flowpath direction at the end of the corner closest to the water outlet;

said type two vortex region comprises a second rounded concave corner having a second radius of curvature and a second generally pointed convex vertex to a second side of the second rounded concave corner, the second rounded concave corner extending from the water inelt to the water outlet initially in said flowpath direction and subsequently curving in a direction at least partially against said flowpath direction at the end of the corner closest to the water outlet.

18. Apparatus according to claim 17 and wherein said first and second radii of curvature are identical.

19. Apparatus according to claim 17 and wherein said first and second radii of curvature are different.

20. Apparatus according to claim 17 and wherein the separation between the imaginary center of curvature of the first rounded concave corner and the first substantially pointed convex vertex is less than the first radius of curvature and the separation between the imaginary center of curvature of the second rounded concave corner and the second generally pointed convex vertex is less than the second radius of curvature.

21. Apparatus according to claim 17 and wherein said intermediate regions have a uniform cross section.

22. Apparatus according to claim 17 and including a plurality of series of intermediate regions and a flow path comprising a plurality of generally elongate sections, each including a plurality of type one and type two vortex regions joined by said intermediate regions.

23. Apparatus according to claim 22 and wherein said intermediate regions are generally parallel to each other.

24. Apparatus according to claim 22 and wherein said intermediate regions are not parallel to each other.

25. Apparatus according to claim 22 and wherein the junction between each of said intermediate regions and each following vortex region defines a substantially sharp corner.

26. Apparatus according to claim 17 and wherein said type one vortex region also includes a first adjacent concave corner adjacent to said first convex vertex.

27. Apparatus according to claim 17 and wherein said type one vortex region also includes a second adjacent concave corner adjacent to said second convex vertex.

28. Apparatus according to claim 17 and wherein said first adjacent concave corner comprises a substantially pointed corner.

29. Apparatus according to claim 27 and wherein said second adjacent concave corner comprises a substantially pointed corner.

30. Apparatus according to claim 27 and wherein said first adjacent concave corner comprises a substantially rounded corner.

31. Apparatus according to claim 27 and wherein said second adjacent concave corner comprises a substantially rounded corner.

* * * * *